United States Patent [19]
Miller et al.

[11] 4,443,341
[45] Apr. 17, 1984

[54] PROCESS AND APPARATUS FOR REMOVAL OF SOLIDS FROM LIQUIDS

[75] Inventors: Michael A. Miller, New Fairfield, Conn.; Richard P. Johansen, Chappaqua, N.Y.

[73] Assignee: Linde Aktiengesellschaft, Wiesbaden, Fed. Rep. of Germany

[21] Appl. No.: 352,976

[22] Filed: Feb. 26, 1982

[30] Foreign Application Priority Data

Feb. 27, 1981 [DE] Fed. Rep. of Germany ....... 3107639

[51] Int. Cl.³ .............................................. B01D 23/10
[52] U.S. Cl. .................................... 210/702; 210/794; 210/796; 210/807; 210/189; 210/198.1; 210/274; 210/280; 210/284
[58] Field of Search .................. 210/790, 792–796, 210/806, 807, 189, 264, 274–276, 280, 281, 284, 702, 665, 669, 198.1, 797

[56] References Cited

U.S. PATENT DOCUMENTS

| | | | |
|---|---|---|---|
| 3,752,762 | 8/1973 | Cincotta | 210/671 |
| 3,846,303 | 11/1974 | Duff | 210/790 |
| 3,897,339 | 7/1975 | Arndt | 210/284 |
| 4,021,339 | 5/1977 | Foody | 210/807 |
| 4,162,216 | 7/1979 | Nyer | 210/806 |

Primary Examiner—Ivars C. Cintins
Attorney, Agent, or Firm—Millen & White

[57] ABSTRACT

A filtration process and apparatus for the removal of solids from liquids is provided having a filter bed vertically disposed in a chamber which has a solids-containing liquid passed horizontally therethrough. The filter bed is regenerated after becoming loaded with solids. During filtering the liquid is divided into at least two partial streams, and each partial stream is conducted through a respective filter bed arranged in a chamber, which is comprised of reticulated particles of polyurethane. After the particles have been completely loaded with the solids, the liquid feed to and the liquid discharge from the respective chamber are interrupted. The solids adhereing to the particles are then transferred by agitation and/or gas treatment into a liquid volume remaining in the chamber, and the liquid volume is discharged together with the solids. The process is especially adaptable to be utilized in wastewater treatment, or for the removal of solids from scrubbing media.

29 Claims, 3 Drawing Figures

PROCESS AND APPARATUS FOR REMOVAL OF SOLIDS FROM LIQUIDS

BACKGROUND OF THE INVENTION

This invention relates to a process for the removal of solids from liquids wherein a solids laden liquid is passed horizontally through a filter bed vertically disposed in a chamber, and wherein the filter bed is regenerated after the filtering material becomes loaded with the solids. This invention also relates to an apparatus for conducting the process.

The general process of passing a solids-laden liquid horizontally through a filter bed is known from U.S. Pat. No. 4,021,339. In the method disclosed therein, the liquid to be purified is passed horizontally through several granular media filter beds disposed in series, and respectively separated from each other by grid-like partitions. The filter media contained in the filter beds are increasingly finer in particle size in the flow direction of the liquid. The regeneration of the filter beds is accomplished by flushing with a washing medium. In order to conduct the regeneration, each filter bed is provided with a feed means at the bottom thereof, and a discharge means at the top for the washing liquid. To regenerate a filter bed, the feed of solids-laden liquid is shut off. A flashing liquid is then introduced under pressure through the feed means into the filter bed from the bottom, and flows through the filter bed in the vertical direction. As a result of this flow the contaminants are entrained in the flushing liquid which is then discharged through the discharge means at the top portion of the filter bed.

However, this process has the recurring disadvantage that with the use of granular filter material, that only a portion of the surface layer acts as a filter because the surface becomes clogged by sedimentation of a large part of the solids. This problem is known as "blinding off" and on account of such clogging, the filtering procedure must be interrupted prematurely because otherwise, the pressure drop becomes too high, and the active filtering layer is diminished very rapidly. Another disadvantage of this type of conventional process is that filtering of the liquid cannot be conducted on a continuous basis so long as even one filter bed requires regeneration. This is due to the fact that because of the varying particle sizes of the filter media in the individual filter beds, filtering must be conducted through all the beds in order for the process to be effective, and the filter beds can never be regenerated, i.e., freed of the deposits, simultaneously. Instead, the beds must be cleaned of these deposits at different points in time, with resulting long downtimes. Thus, because of these disadvantages, the process is rendered uneconomical. Furthermore, the requirement of providing a separate flushing liquid also represents another drawback.

In another prior art process, a filtration media such as sand is supported on a horizontal bed of gravel, and solid-contaminated liquid is forced to flow by gravity, or pressure, vertically downward through the filter bed. Once the bed becomes loaded with the solid contaminant, the influent flow is terminated and the wash liquid is flowed through the filter media in a direction opposite to the influent flow to remove the deposited solid particles from the bed. Generally, backwash water volumes of about 2.5% of the volume of water treated during the filtering cycle are typical, and the backwash velocity must be sufficient to fluidize the sand bed, and cause inter-particle collisions. Furthermore, this process is also subject to the "blinding off" problem described previously, and backwashing must be conducted earlier than desired to prevent this problem.

It is known from U.S. Pat. No. 4,162,216 to employ a bed of discontinuous, flexible polyurethane particles as the filtration media, with the polyurethane being preferably reticulated, having numerous interconnected cells. In this process, the influent liquid is passed downwardly through the bed as in conventional filtration systems, and the solid contaminants in the liquid are retained on, but primarily within the polyurethane particles. This system provides many advantages relative to the rapid sand or multi-media filtration systems, including a higher solids loading capacity as well as a lower pressure drop across the bed. Furthermore, regeneration is less complex reducing the amount of liquid required by over 75%, as compared to conventional granular filtration systems. However, the system of U.S. Pat. No. 4,162,216 fails to fully utilize the benefits provided by employing polyurethane as a filter media because the design of the system is basically the same as that of conventional vertical filtration sand and multi-media filter systems.

In a related area, U.S. Pat. No. 3,752,762 discloses an apparatus for filtering oil by passing oil-contaminated water horizontally through filter beds comprised of pumice stones. When the pumice stones become loaded with oil they are removed from the filter bed to be regenerated by steam scrubbing. When regenerated, the stones are returned to the filter bed for additional filtering to be conducted. However, this system cannot be used to remove solids from a solids-contaminated liquid, and in this regard, is inapplicable to the invention.

SUMMARY OF THE INVENTION

It is thus an object of the invention to provide a method and apparatus for filtering a solids-containing liquid through a particulate polyurethane, filter media in a manner making optimal use of the advantageous properties of the filter media.

It is another object of the invention to provide a method and apparatus for removing solids from a solids-contaminated liquid which significantly reduces the area, or space, required for use of filtration systems.

Upon further study of the specification and appended claims, further objects and advantages of this invention will become apparent to those skilled in the art.

In accordance with the invention there is designed a process of the aforementioned type, as well as an apparatus for conducting the process, in a way such that a high and extensively continuous cleaning effect is attained in a simple and economical procedure.

This problem is solved in accordance with the invention by dividing an influent solids-containing liquid into at least two partial streams. Each partial stream is horizontally conducted through respective filter beds arranged in a chamber, and containing particles of polyurethane foam, and when the polyurethane particles are entirely loaded with the solids, the liquid feed to, and the liquid discharge from the respective chambers are interrupted. The solids adhering to the particles are then transferred by agitation and/or gas treatment into the remaining liquid volume in the chamber, and the liquid volume is withdrawn together with the solids. When the liquid volume containing solids is removed, the filter media has been regenerated.

By subdividing the solids-containing liquid stream into at least two partial streams, it is ensured that the filtering process can be conducted continuously. More specifically, if one filter bed is being regenerated, filtering of the liquid can still be simultaneously conducted in another filter bed. When using such polyurethane particles as the filtering medium, it is possible to merely utilize the liquid volume present in the chambers for the regenerating step so that there is no need to conduct a separate flushing liquid into the filter beds for the regenerating step. This is due to the fact that polyurethane particles are readily regenerated. Furthermore, the loading capacity of such a filter media is substantially higher, particularly as compared with conventional granular filtering media, so that relatively less filter medium needs to be provided than in the conventional process, and thus, the regenerating procedure can be shortened.

In this connection, it is especially advantageous to conduct each partial stream through the filter bed at a flow rate of about 40–400 liters/minute per square meter. At such a flow rate, an adequate contact between the liquid and the particles of polyurethane particles is ensured, so that the liquid does not flow through the filter media without transferring the solids thereto.

It is preferred that the filter medium be made up of particles of polyurethane having a cellular density of 4–40 cells/centimeter, and a loading capacity of 15–20 kg of solids per cubic meter. Furthermore, a bulk density of the particles of at least 16 kg/m$^3$ should be maintained in the filter bed. When such particles are employed, a uniform distribution of the filter medium over the entire filter bed is obtained, and a high solids loading capacity is ensured.

When regeneration of the filter beds is by agitation, in one embodiment the agitation for transferring the solids to the liquid volume of the chamber of the filter bed is conducted outside of the chamber. This avoids possible interference with the filtering process in the filter beds as a result of the presence of an agitating device therein.

The apparatus for conducting the filtering process of this invention comprises a filter bed, and preferably at least two, vertically disposed in a chamber, which has an inlet for the solids-containing liquid, and an outlet for purified liquid. The liquid is passed horizontally through the filter bed. The apparatus also includes a regenerating device for the filter bed.

In accordance with the invention, such an apparatus includes at least two chambers with a respective filter bed, with the two chambers connected in parallel adjacent each side of the filter bed. The filter beds are made up of particles of polyurethane. The inlets and the outlets of the individual chambers are provided with respective valve means to control the flow into and out of the filter beds, and the regenerating device employed in the apparatus is an agitating and/or gas-treatment device. In one embodiment, a discharge means is provided for the liquid volume present in the respective chamber after shutting off the inlet and outlet for the liquid to be purified, and the regeneration of the filter bed is conducted in situ so that the liquid volume absorbs, during regeneration of the particles of polyurethane, the solids adhering to the particles, and the liquid volume is then discharged through the discharge means.

The particles of polyurethane are arranged in the chambers respectively between two parallel, porous wells which support the particles. In accordance with another embodiment, the agitating device is disposed outside of the chamber in a regenerating vessel in communication with the chambers. The vessel typically includes a feed conduit, and a separate recycle conduit, connected to the filter beds and projecting into the latter. Thus, in order to conduct the regeneration of the filter media, the particles having solids embedded therein are removed from the filter bed and conducted to the regenerating vessel. They are then mechanically agitated therein along with the liquid remaining in the chambers which was removed therewith, and the liquid is removed from the regenerating vessel carrying off the solids from the regenerated filter material. The filter material is then recycled to the filter bed to continue conducting the process. The separate recycle conduit extending into the filter bed ensures that, while recycling the particles from the regenerating vessel into the respective filter bed, a uniform distribution of the particles is achieved therein.

The present invention can be especially advantageously utilized in all separation processes wherein solids are to be separated from liquids, such as, for example, in wastewater treatment or for the removal of solids from washing agents.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

Figure 1:
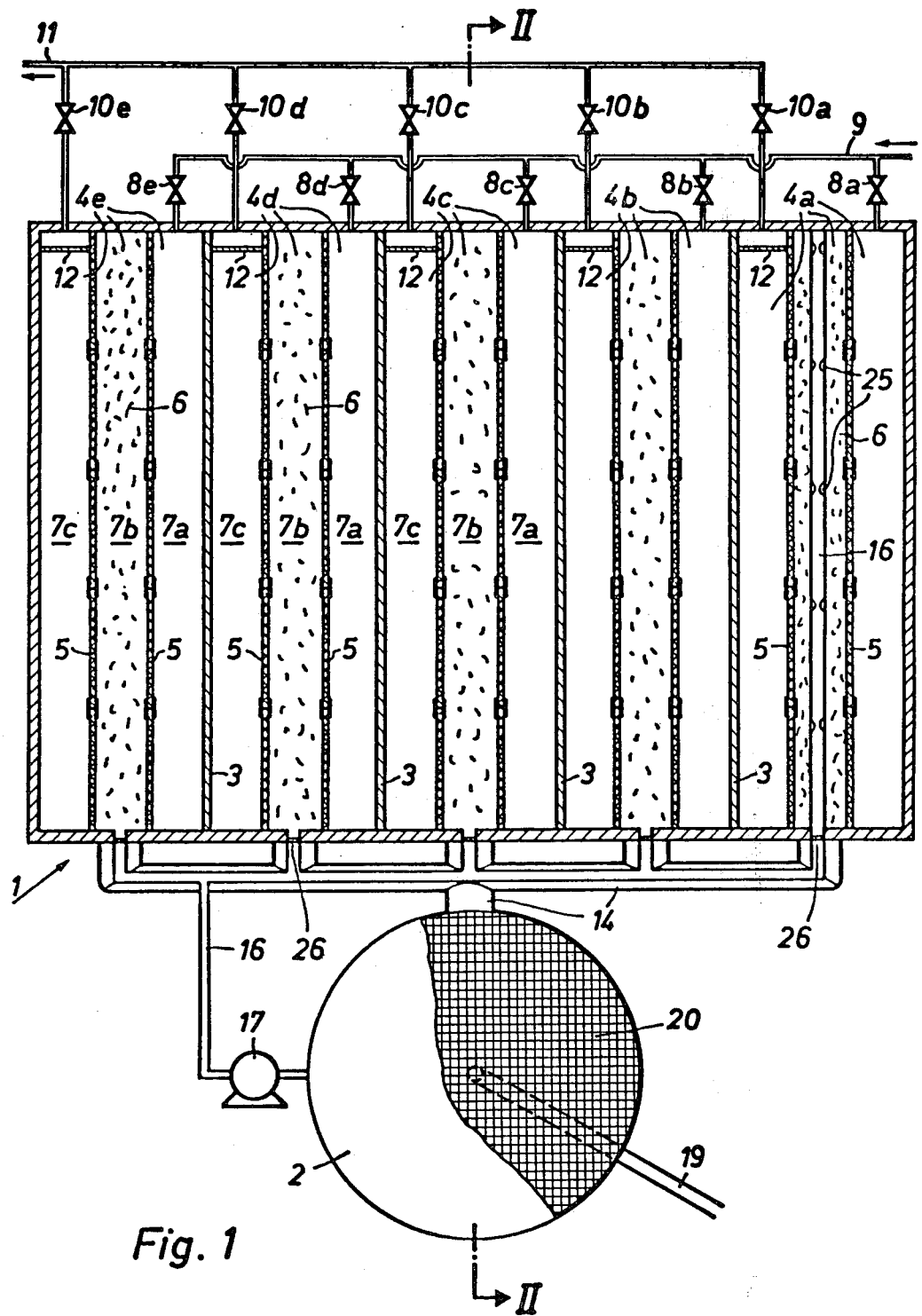
FIG. 1 is a top plan view of the filtration system according to the invention, with a plurality of spaced apart filter beds of discontinuous polyurethane particles arranged in the chambers, and with a regenerating device provided outside of the chambers.

In accordance with one embodiment as illustrated in FIG. 1, the apparatus of the invention includes two main elements, a filtration vessel 1 and a regenerating vessel 2. The filtration vessel 1 is divided by vertical sidewalls into at least two chambers, and as shown in FIG. 1, into five chambers 4a through 4e. Each of chambers 4a through 4e comprise two parallel, vertical porous walls 5, and within these walls 5, particles of polyurethane are arranged as the filter medium 6. These walls 5 must be constructed sufficiently porous to allow solids-laden liquid to easily pass through, but must also be capable of supporting the filter media particles within the confined space defined thereby. In this way, each chamber is subdivided into three sections, i.e, an inlet chamber 7a for the solids-laden liquid, a filter bed 7b, and an outlet chamber 7c for the liquid free of solids.

The inlet chambers 7a are in communication through shutoff means 8a through 8e, such as conventional valves, with a feed means 9 for supplying the solids-laden liquid. The outlet chambers 7c are in communication through shutoff means 10a through 10e, also such as conventional valves, with a drain 11 for removal of the liquid freed of solids. In this arrangement the liquid to be purified passes respectively horizontally through the vertically disposed filter beds 7b.

In the specific embodiment of FIG. 1, the porous walls 5 are typically made up of panels of a thickness of 10–15 cm made of open-cell polyurethane foam of a low cellular density (for example 4 cells/cm), such as is readily obtainable as stock material. The polyurethane foam is held in place by parallel-disposed double-T supports with suitable cross struts. The filter bed 7b has a width of approximately 60–90 cm, and is filled with a filter medium 6 of particles of polyurethane foam. In the broad practice of the invention, however, the porous retainer walls may be of alternate construction such as a suitably supported wire screen.

In this arrangement, a high spatial efficacy of the filter bed is achieved, wherein the filter becomes effective not only in the surface layers but also over the entire cross section. Consequently, the mode of operation is enhanced by using a thick, column-shaped filter bed, the thickness of the filter bed being limited above all by pressure drop considerations. More specifically, if the bed is too thick, then the pressure drop as the bed becomes loaded with solids increases to an excessive level and overall operation is significantly impaired.

The height of the filter bed, can be determined conventionally and is not considered important with regard to settling of solids in the liquid, and uneven vertical loading of the filter is not a problem because of the short residence times, and because the solids in the liquid are of the type which are easily dispersed. The filter bed may typically have a height of approximately 150–240 cm.

In operation, the solids-laden liquid passes through conduit 9 into the filtering vessel 1. The liquid enters the inlet chambers 7a by way of the inlet valves 8a through 8e, and passes in the horizontal direction through the first porous wall 5 into the filter bed 7b having the particles 6 of polyurethane contained therein. The liquid, in this connection, is passed at a flow rate of preferably 40–400 l/min·m$^2$ of filter bed cross-sectional area, and more preferably 160 l/min·m$^2$ in order to ensure adequate contact with the particles of polyurethane. As the solids-laden liquid is passed thriugh the particles of polyurethane, the solids are retained in the filter bed, and a solids-free liquid enters the outlet chamber 7c, and from there passes through a weir 12, which operates to control the liquid level and through outlet valves 10a through 10e into the discharge means 11 for purified liquid. When the solids-laden liquid is passed through the filter bed, the solids are primarily trapped in the open pore spaces of the polyurethane particles, although some trapping occurs between particles themselves.

The flow rate in the filter bed 7b must be selected so that a satisfactory liquid distribution in the filter bed is ensured. During passage of the liquid through the filter bed, the pressure drop in the filter beds is reflected as the difference in the liquid level between the inlet chamber and the outlet chamber, and can therefore, be regulated by the wier 12. Weir 12 may typically be approximately 20–50 cm below the liquid level 12 the inlet chamber.

The particles of polyurethane utilized are preferably discontinuous flexible polyurethane foam particles, and can be produced, as mentioned above, for example of any suitable polyurethane foam exhibiting the required retention capacity for the solids desired to be removed. The use of discontinuous foam particles provides flow channels to promote flow of part of the solids laden liquid into the depth of the filter bed, promoting the use of the full bed depth for retention of solids. The particles can be, for example, shredded non-uniformly sized particles, or alternatively, cubic shaped pieces or other regular form. It is preferred that the particles used be the shredded uneven particles, primarily because they are more economical to form. Suitable polyurethane foams successfully employed include reticulated ester or ether linked polyurethane foam having a cellular density of 4–40 cells/cm, preferably 12–24 cells/cm. The bulk density of the polyurethane foam particles should preferably be at least 16 kg/m$^3$, to ensure structural unity of the filter bed.

In the present embodiment, comminuted particles of polyurethane foam are utilized having a maximum diameter of about 25–50 mm, a cellular density of 24 cells/cm, and a bulk density of about 28.8 kg/m$^3$. The tensile strength should be at least 270 kpa.

In order to further enhance the efficacy of solids removal in the filter bed, it may be desirable to add a coagulant such as an organic polymer coagulant, sodium silicate or aluminum hydroxide, i.e., alumn, to the liquid to be purified. Such coagulant materials tend to increase the flocculation of suspended solids in the liquid undergoing treatment, and reduce the turbidity of the effluent liquid discharged from the filtration vessel.

Figure 2:
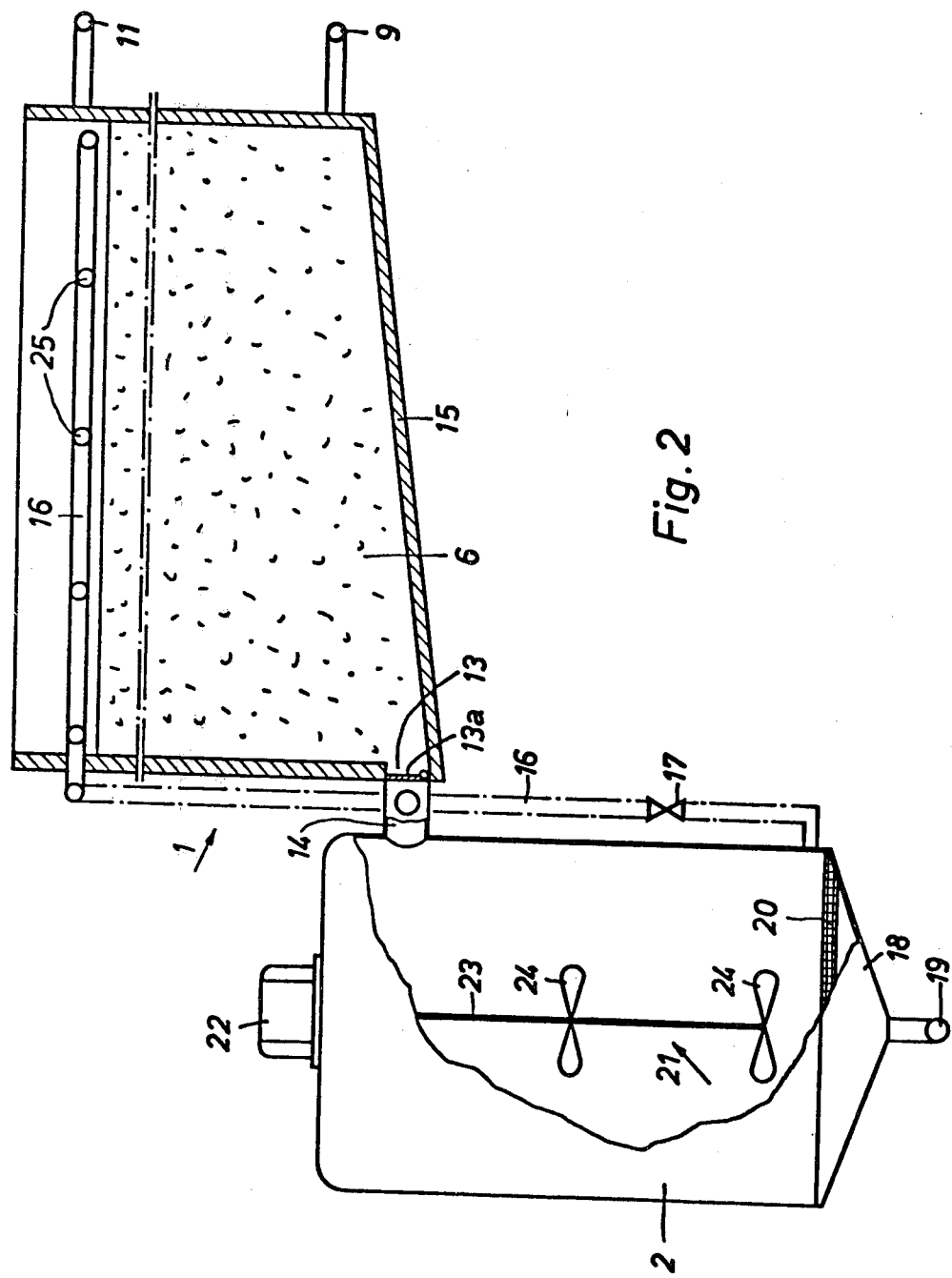
FIG. 2 is a cross-section along line II—II of FIG. 1 of the apparatus fo the invention.

Since the particles of polyurethane become at least partially loaded with solids during the filtering process, the filter beds must be regenerated. For this purpose, each chamber 4a through 4e is connected to a regenerating vessel 2 through an opening 13 as shown in FIG. 2, respectively arranged on the bottom of the filter beds 7b, and by way of a joint feed conduit 14. The openings 13 can be separately blocked off by means of a sluice gate or shutoff valve 13a. The bottom 15 of each filter bed 7b is inclined toward the opening 13 so that the particles of polyurethane, can be easily withdrawn through the supply conduit 14. In the present example, the particles are thereby conveyed solely due to gravity into the regenerating vessel 2. In this embodiment, the regeneration of the polyurethane foam media is by mechanical agitation. This particular method of regeneration is specifically disclosed in U.S. Pat. No. 4,162,216 to Nyer which is incorpoated by reference herein.

The regenerating vessel 2 is a cylindrical tank having a slanting bottom surface to which is connected a drainage conduit 19 for solids-laden liquid to be removed therefrom. In the lower portion of the regenerating tank, an intermediate surface 20 of a screen or another fine-mesh material is arranged for preventing the regenerated particles from being discharged together with the liquid drained off through outlet conduit 19. In this regard, the mesh openings must be smaller than the polyurethane foam particles. Furthermore, the regenerating vessel 2 includes a mechanical agitator 21 made up of a mechanical drive means 22, a shaft 23, and a mixer 24. This agitator is conventional in nature will be well known to those skilled in the art.

To facilitate the return of the regenerated particles of polyurethane to the filter beds 7b, a recycle conduit 16 is provided which extends above the filter beds 7b and into each of the individual chambers along the length thereof. A pump 17, located in the recycle conduit 16, serves to return the regenerated particles into the filter beds, which is distributed therein through outlet apertures 25 extending throughout recycle conduit 16. The return flow of the regenerated particles from the recycle conduit 16 is controlled for each filter bed 7b by means of a sluice gate or sutoff valve 26.

As the polyurethane foam media in each of the filtering units becomes at least partially loaded, each of the filtering units is sequentially regenerated in a cyclic manner. For example, to regenerate the particles of polyurethane in the filter bed 7b of chamber 4a, the inlet valve 8a and the outlet valve 10a are closed so that it is no longer possible for contaminated, i.e., solids-laden, liquid to enter the inlet chamber 7a, and no purified liquid can exit from the outlet chamber 7c. The sluice gate or shutoff valve 13a at the bottom of the filter bed 7b is then opened, and the particles of polyurethane pass into the regenerating vessel 2, together with the residual liquid remaining in the chambers. The passing of the particles and liquid is obtained by gravity. By appropriately sizing the inlet and outlet chambers 7a and 7c, the total quantity of the wash liquid needed for regeneration can be obtained by merely opening the sluice gate 13a. In other words, no additional liquid is required.

Once the slurry of discontinuous polyurethane particles from the filter bed 7b is in the regenerating vessel 2, the mechanical agitator 21 is turned on. By providing a sufficient duration of agitation, for example about 3 minutes, the solids retained in the polyurethane foam particles are released into the surrounding liquid. The released solids and water are then rapidly drained from the regeneration vessel through outlet conduit 19. Clean water from an outside source is then added to the cleaned polyurethane foam still remaining in the regenerating vessel 2. A polyurethane foam slurry is formed thereby and pumped by pump 17 and returned through the recycle conduit 16, the open valve 26, and the outlet openings 25 into the filter bed 7b and distributed therein, wherein they settle into the filter bed. The amount of clean water added corresponds to the amount in the chamber volume 4a originally introduced into the vessel 2. Thereupon, the inlet and outlet valves 8a and 10a are opened again, and the chamber 4a is once more available for conducting the filtration.

Figure 3:
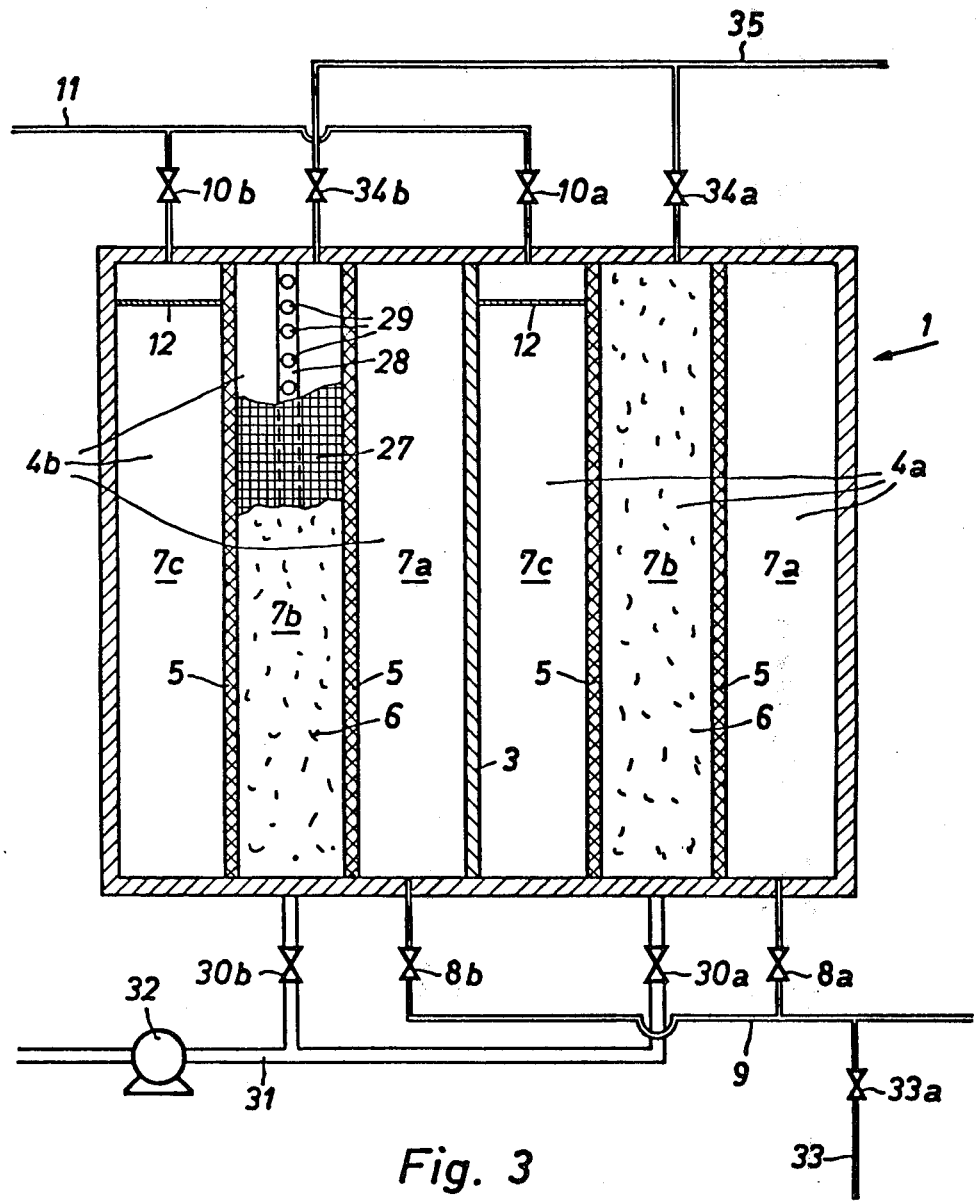
FIG. 3 is a top plan view of another filtration system that can be operated according to an alternative method of the invention.

FIG. 3 shows another embodiment of the present invention. The main feature of this specific embodiment, is that the regeneration of the solids-loaded particles of polyurethane is conducted in situ by means of a gas, for example air, scouring.

The arrangement of the invidual filter chambers corresponds to the example described hereinabove with reference to FIG. 1. However, to simplify the illustration, only two chambers are shown in a top plan view in FIG. 3. Identical components bear the same reference numerals.

The particles 6 of polyurethane of the filter bed 7b are supported on a screen 27 of wire mesh or some other fine-mesh material. The screen 27 is constructed so that the solids-laden liquid can pass through undisturbed while at the same time preventing filter media particles from passing therethrough. An air distributing tube 28 is arranged below the screen 27 and extends over the entire width of the filter bed 7b. This tube 28 includes a plurality of apertures 29 constructed so that the gas can be introduced into the filter bed 7b in a manner such as to enable conducting the regeneration. The gas distributing tubes 28 are in communication with an air inlet manifold 31 through valves 30a and 30b. The compressed gas, for example air, is fed to the manifold 31 by means of compressor 32. The filter beds 7b are connected through valves 34a and 34b respectively, with a discharge conduit 35 for removing the liquid loaded with solids.

In order to regenerate the filter bed 7b of chamber 4a, for example, the inlet valve 8a and the outlet valve 10a are closed, so that no solids-laden liquid can enter into the inlet chamber 7a and no purified liquid can exit from the outlet chamber 7c. As in the FIGS. 1 and 2 embodiment by appropriately sizing the inlet chamber 7a and the outlet chamber 7c, the residual liquid in the filtering unit 7b may be sufficient for regeneration. If additional clean liquid is required, however, or a multiple wash cycle is employed, a clean liquid supply can be provided. The liquid present at that instant in the chamber 4a is thus retained therein.

Regeneration is initiated by opening the valve 30a in the manifold 31 so that gas flows from conduit 31 into the distributing tube 28, and sparged through apertures 29 into the filter bed 7b particles. The amount of gas is provided in sufficient quantity and rate so that the liquid and the particles of polyurethane are agitated to cause the filtered solids to disengage from the polyurethane particles and pass into the wash liquid.

As noted before, the porosity of the porous retainer walls 5 is sufficient to permit the free interchange of wash liquid and solid-containing liquid between the outer chambers 7a and 7c, and the inner chamber 7b.

Preferably, the gas is sparged into the wash liquid containing polyurethane foam particles for a period of about 0.5 to 5 minutes at a rate of about 150–1,500 Nl/min·m$^2$ cross-sectional area of the filter bed, preferably 500 Nl/min·m$^2$, into the latter. In cases where water is being filtered having low solids concentrations of 200 mg/l or less, 300–600 Nl/min·m$^2$ with a feeding period of about 1–2 minutes proved to be adequate for regenerating the particles of polyurethane. After the appropriate feeding period, the valve 34a is opened and the solids-laden wash liquid is withdrawn through conduit 35.

Following the gas sparging agitation of the wash liquid and polyurethane foam particles for the necessary time, valve 34a in the solid-containing liquid discharge conduit 35, which is located in the inlet chamber below the grid 27, is opened and the agitated solid-containing liquid is rapidly drained from the filtering unit 7b. In the general practice of the invention, it has been found advantageous to drain the agitated solid-containing liquid from the regeneration vessel at a rate of about 60 to 250 m$^3$/min·m$^2$ of horizontal bed cross-sectional area, and preferably at a rate of 125 to 180 m$^3$/min·m$^2$ of horizontal bed cross-sectional area. The solid-containing liquid discharged as waste effluent through discharge conduit 35 may thereafter be subjected to further treatment steps, such as dewatering. Following drainage of the solid-containing liquid from the filtering unit 4b, valve 30a and 34a are closed. In some applications, it may be desirable to repeat the regeneration steps in sequence as successive regeneration cycles. Normally, no more than 2–4 such successive regeneration cycles need be carried out.

After the regeneration, the valves 8a and 10a are opened and the filtering process is again started.

The present invention is not restricted solely to the preferred embodiments described in detail herein. Thus, it is possible, for example, to apply the method of regeneration with air scouring to the arrangement of FIGS. 1 and 2 in order to regenerate the particles of polyurethane in the regenerating vessel 2 exclusively by air scouring, or in conjunction with mechanical agitation.

In the same manner that polyurethane particles are used, other materials having similar properties, with regard to filtration, as the described polyurethane can be used in place thereof. The primary necessary features of the material being that it provide an equivalent filtering to that of the polyurethane discussed.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of solids from liquids comprising passing a solids-containing liquid horizontally through a filter bed vertically disposed in a chamber, and wherein the filter bed is regenerated after absorption of the solids, the improvement comprising the sequential steps of dividing the liquid stream into at least two partial streams, conducting each partial stream through a respective filter bed arranged in a chamber, with each filter bed comprising discontinuous flexible polyurethane particles, interrupting the liquid feed to and the liquid discharge from the respective chamber after the polyurethane particles have been substantially completely loaded with the solids, regenerating the polyurethane particles by at least one of agitating and gas treating said polyurethane particles to cause the solids adhering thereto to be transferred into the remaining liquid volume of the chamber, and discharging the remaining liquid volume together with the solids, whereby said polyurethane particles are regenerated.

2. A process according to claim 1, wherein each partial stream is conducted through the filter bed at a flow rate of 40–400 l/min·m$^2$.

3. A process according to claim 1 or 2 further comprising conducting the filtering through filter beds having polyurethane particles having a cellular density of 4–40 cells/cm, and a loading capacity of 15–20 kg of solids per m$^3$.

4. A process according to claim 1 further comprising maintaining a bulk density of the particles of polyurethane of at least 16 kg/m$^3$ in the filter bed.

5. A process according to claim 1 further comprising conducting the regeneration by agitation for transferring the solids in the polyurethane particles to the liquid volume of the chamber externally of the chamber.

6. A process according to claim 1, wherein said regeneration of the polyurethane particles comprises agitating said particles.

7. A process according to claim 6 wherein said agitating of said particles is done by mechanical means.

8. A process according to claim 1, wherein said regeneration of the polyurethane particles comprises gas-treating said particles in situ in the filter beds.

9. A process according to claim 1 further comprising adding a coagulant to the liquid to be purified before conducting the partial streams through the beds to increase flocculation of suspended solids.

10. A process according to claim 1 wherein the partial streams are passed through filter beds or reticulated polyurethane particles.

11. An apparatus for conducting a filtering process for removal of solids from a solids-containing liquid, comprising at least two vertically arranged filter beds made up of discontinuous polyurethane particles, and two chambers associated with said filter beds, with each one of the two chambers arranged parallel to each of said filter beds on opposite sides thereof for passing a solids-containing liquid into one of the chambers to be passed horizontally through the respective filter bed and into the other chamber after having solids removed therefrom in said filter bed, inlet means associated with one of said chambers for supplying solids-containing liquid to be filtered into said one chamber, and outlet means associated with the other chamber for removing solids-free liquid therefrom, each of said inlet and outlet means having closing means for controlling flow into and out of the chambers, dividing means for dividing the solids-containing liquid into at least two partial streams, and means for conducting each partial stream through a respective filter bed, regenerating means associated with said filter beds and comprising at least one of mechanical agitating means and gas-treatment means for regenerating the particles of polyurethane in the filter beds by removing solids therefrom and for passing said solids into a liquid volume associated with the polyurethane particles when filtering is not being conducted, and discharge means for removing the liquid volume containing solids, after regeneration of the polyurethane filter bed particles, from said filter bed particles.

12. An apparatus according to claim 11, wherein said particles of discontinuous polyurethane are arranged in filter bed chambers defined by two spaced parallel, porous walls (5).

13. An apparatus according to claim 11 or 12, wherein said the mechanical agitating means (21) is arranged outside the chambers, and said regenerating means comprising a regeneration vessel (2) located in communication with said filter bed chambers.

14. An apparatus according to claim 13, wherein the regenerating vessel (2) comprises a feed conduit (14) and a separate recycle conduit (16) for the particles of polyurethane, said recycle conduit being connected to the filter bed chambers and projecting into said filter bed chambers for uniformly distributing regenerated polyurethane particles returned to said filter bed.

15. An apparatus according to claim 11, wherein said polyurethane particles comprise discontinuous flexible polyurethane particles having a density of about 4–40 cells/centimeter, and a loading capacity of about 15–20 kg of solids per cubic meter.

16. An apparatus according to claim 11, wherein said filter particles are held in place by porous retaining means.

17. An apparatus according to claim 11, comprising porous retaining means for defining said filter beds of open-cell polyurethane particles, with said porous retaining means comprising open-cell polyurethane foam panels of a cellular density of about 4 cells/cm and having a thickness of about 10–15 cm, and said panels being held in place by parallel double-T supports and cross-struts.

18. An apparatus according to claim 17 comprising 5 filter beds.

19. An apparatus according to claim 11, wherein the bulk density of said polyurethane filter particles is at least 16 kg/cm$^3$ and the loading capacity for solids is above 15 kg/m$^3$ of polyurethane foam.

20. An apparatus according to claim 11 comprising a plurality of filter beds.

21. An apparatus according to claim 11, wherein said polyurethane particles are reticulated polyurethane particles.

22. An apparatus according to claim 11 wherein said regenerating means comprises gas-treatment means for regenerating the particles of polyurethane, and wherein the gas-treatment means is arranged in situ in the apparatus for conducting the filtering process, immediately below each filter bed.

23. An apparatus according to claim 11 further comprising coagulant adding means for adding a coagulant to liquid to be purified in the filter bed for increasing flocculation of suspended solids in the liquid to be purified.

24. An apparatus for conducting a filtering process for removal of solids from a solids-containing liquid, comprising at least one vertically arranged filter bed made up of discontinuous polyurethane particles, and two chambers associated with said filter bed with each one of the two chambers arranged parallel to said filter bed on opposite sides thereof for passing a solids-containing liquid into one of the chambers to be passed horizontally through the filter bed and into the other chamber after having solids removed therefrom in said filter bed, inlet means associated with one of said chambers for supplying solids-containing liquid to be filtered into said one chamber, and outlet means associated with the other chamber for removing solids-free-liquid therefrom, each of said inlet and outlet means having closing means for controlling flow into and out of the chambers, regenerating means associated with said filter bed and comprising at least one of mechanical agitating means and gas-treatment means for regenerating the particles of polyurethane in the filter bed by removing solids therefrom and for passing said solids into a liquid volume associated with the polyurethane particles when filtering is not being conducted, with said mechanical agitating means arranged outside the chambers, discharge means for removing the liquid volume containing solids after regeneration of the polyurethane filter bed particles from said filter bed particles, and said regenerating means further comprising a regeneration vessel located in communication with said filter beds.

25. An apparatus according to claim 24 wherein the regenerating vessel (2) comprises a feed conduit (14) and a separate recycle conduit (16) for the particles of polyurethane, said recycle conduit being connected to the filter bed chambers and projecting into said filter bed chambers for uniformly distributing regenerated polyurethane particles being returned to said filter bed.

26. An apparatus according to claim 24 comprising porous retaining means for defining said at least one vertically arranged filter bed of discontinuous polyurethane particles, with said porous retaining means comprising open-cell polyurethane foam panels of a cellular density of about 4 cells/cm and having a thickness of about 10-15 cm, and said panels being held in place by parallel double-T supports and cross-struts.

27. An apparatus according to claim 24 further comprising coagulant adding means for adding a coagulant to liquid to be purified in the filter bed for increasing flocculation of suspended solids in the liquid to be purified.

28. An apparatus for conducting a filtering process for removal of solids from a solids-containing liquid, comprising at least one vertically arranged filter bed made up of discontinuous polyurethane particles with said filter bed defined by two spaced parallel porous walls, and two chambers associated with said filter bed with each one of the two chambers arranged parallel to said filter bed on opposite sides thereof for passing a solids-containing liquid into one of the chambers to be passed horizontally through the filter bed and into the other chamber after having solids removed therefrom in said filter bed, inlet means associated with one of said chambers for supplying solids-containing liquid to be filtered into said one chamber, and outlet means associated with the other chamber for removing solids-free-liquid therefrom, each of said inlet and outlet means having closing means for controlling flow into and out of the chambers, regenerating means associated with said filter bed and comprising at least one of mechanical agitating means and gas-treatment means for regenerating the particles of polyurethane in the filter bed by removing solids therefrom and passing said solids into a liquid volume associated with the polyurethane particles when filtering is not being conducted, with said mechanical agitating means arranged outside the chambers, and said regenerating means further comprising a regeneration vessel located in communication with said filter bed chambers, and discharge means for removing the liquid volume containing solids after regeneration of the polyurethane filter bed particles from said filter bed particles.

29. An apparatus according to claim 28 wherein the regeneration vessel (2) comprises a feed conduit (14) and a separate recycle conduit (16) for the particles of polyurethane, said recycle conduit being connected to the filter bed chambers and projecting into said filter bed chambers for uniformly distributing regenerated polyurethane particles being returned to said filter bed.

* * * * *